Sept. 21, 1971   J. N. SHINN ET AL   3,606,902
BOURDON TUBE FLUIDIC TRANSDUCER
Filed May 15, 1969   2 Sheets-Sheet 1
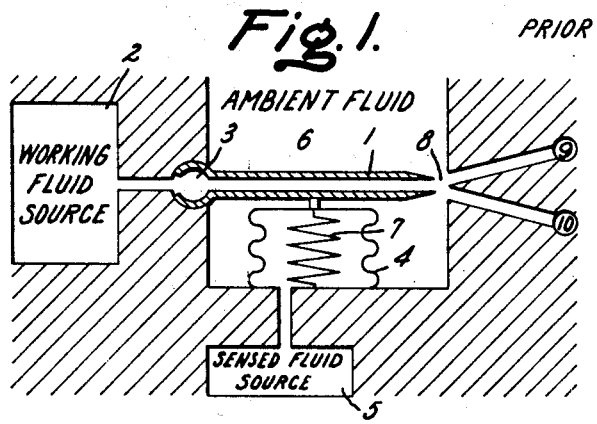
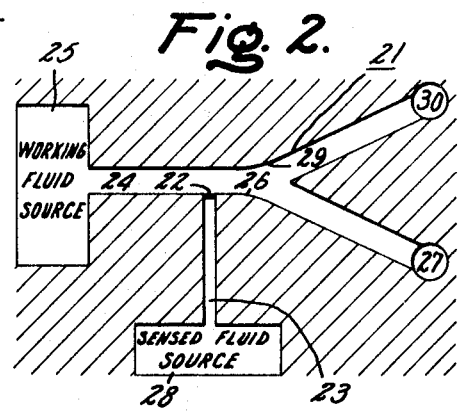
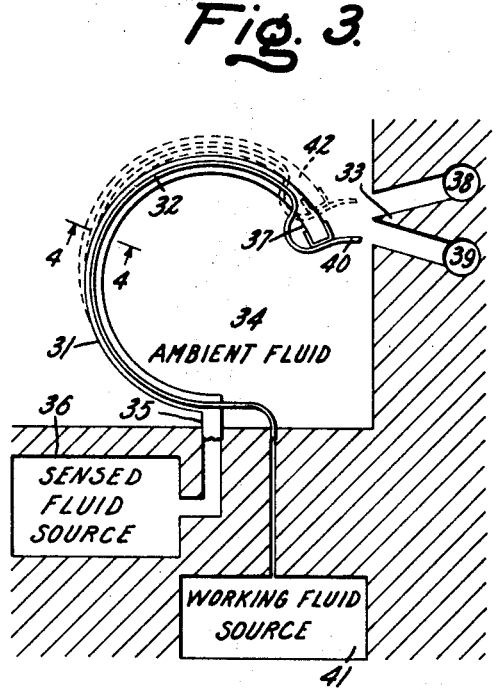
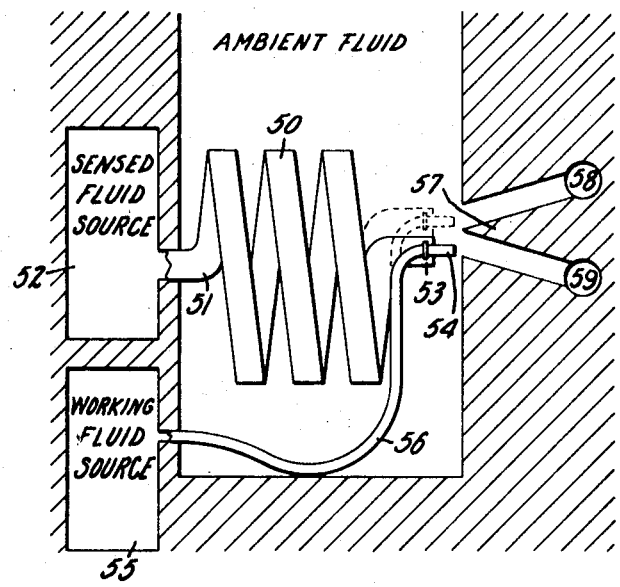
Inventors:
Jeffrey N. Shinn,
Carl W. Woodson,
by Louis A. Moncha

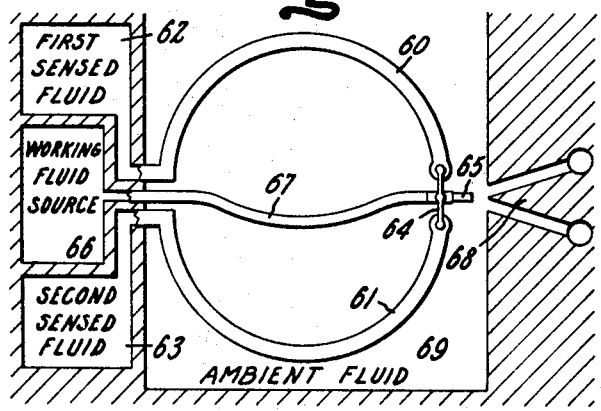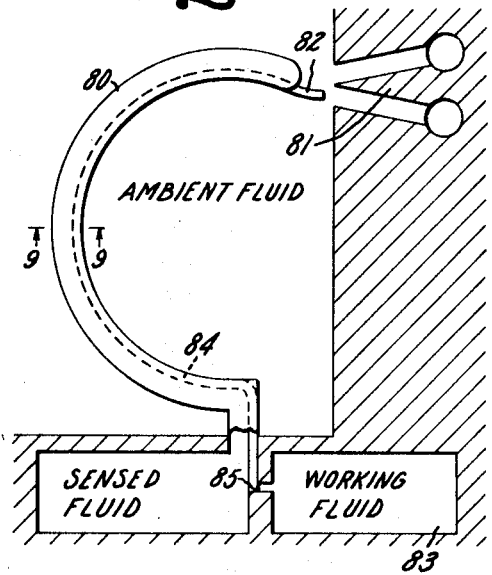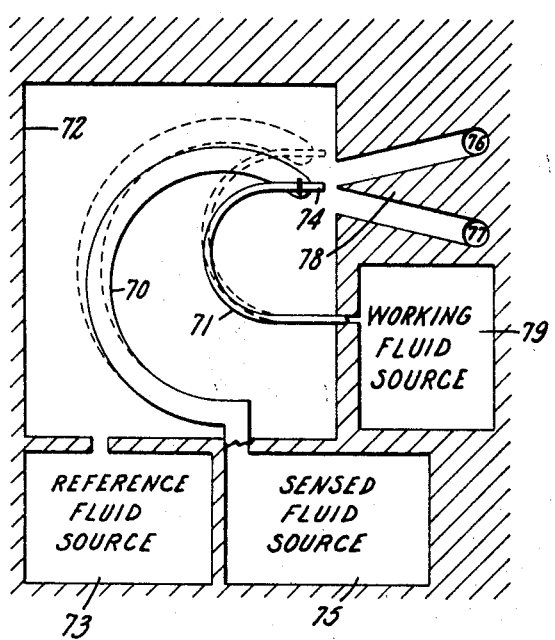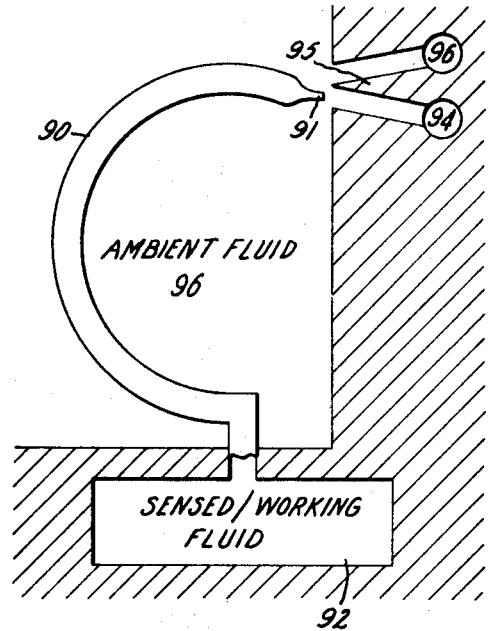

United States Patent Office 3,606,902
Patented Sept. 21, 1971

3,606,902
BOURDON TUBE FLUIDIC TRANSDUCER
Jeffrey N. Shinn, Scotia, N.Y., and Carl W. Woodson, Lomita, Calif., assignors to General Electric Company
Filed May 15, 1969, Ser. No. 824,984
Int. Cl. F15b 5/00, 13/02; G05d 16/00
U.S. Cl. 137—83                                  5 Claims

ABSTRACT OF THE DISCLOSURE

A Bourdon tube which responds to pressure changes in a sensed fluid is used to selectively deflect the flow of a working fluid between various ports of a fluidic receiver.

---

This invention relates to fluid-operated transducers and, more particularly, to fluid-operated transducers which employ means for controllably deflecting a moveable nozzle between various ports of a fluidic receiver.

In the process control field it is frequently necessary to detect pressure changes in a fluid being processed and to translate these pressure changes into differential fluid signals suitable for incorporation as an input to standard fluidic circuit elements. Where the fluid being sensed is corrosive, or contains impurities, or resides at a relatively high pressure level, it is necessary to maintain the sensed fluid in a state of segregation with respect to the working fluid used by the various fluidic components.

Pressure changes occuring in sensed fluids are generally measured in relation to some known, relatively stable, pressure standard. This pressure standard may be provided by either the atmosphere, a vacuum, or a fluid maintained at a known pressure level. Since pressures within a particular fluid system are measured with respect to the standard pressure, the latter may be viewed as the fluid analogue of "ground potential" in an electrical system. Accordingly, sensed signals supplied to a pressure transducer normally take the form of "single-sided" inputs rather than differential or "push-pull" inputs, and transducer reaction is related to the difference between the pressure of the sensed fluid and that of the standard. Because many fluidic devices, such as proportional amplifiers, require differential rather than single-sided input signals, a transducer is required which is capable of receiving as an input, single-sided pressure signals from a sensed fluid and translating these into directly related differential pressure signals in a second dissimilar fluid, while providing isolation between the two fluids.

The most successful prior art attempts at resolving the above-described problem may be summarized in terms of two basic approaches, each of which will be discussed in more detail later in the specification. The first prior art approach contemplates the use of a rigid, pivotally mounted, jet pipe which diverts a stream of working fluid into the various ports of a fluidic receiver in response to physical deflection of the jet pipe imparted by an expandable bellows which is actuated by pressure changes in a sensed fluid. The second prior art approach has as its basic functional component a single-sided, boundary layer type, fluidic amplifier having a sensed fluid activated diaphragm located at the output of the control port which, in response to increased pressure of the sensed fluid, protrudes into and disturbs the boundary layer along the preferred wall of attachment, causing the stream of working fluid to "switch" from one output port to another.

While the first prior art approach generally satisfies the functional criteria described at the outset, it is relatively expensive to manufacture; further, its performance and range of application are limited by the relatively high sliding friction in the pivotal mounting, the inertia associated with the jet pipe, the large number of separate parts, and the low pressure ranges typically associated with expandable bellows. The second prior art approach is relatively inexpensive to produce, but its application is limited to situations requiring a binary fluidic output.

Because Bourdon pressure tubes are uniquely capable of accurately translating changes in fluid pressure into physical movement, they have long been incorporated as central elements in precision fluid test equipment. The subject invention avoids many of the difficulties inherent in prior art devices by using a Bourdon tube as a means for controllably deflecting the flow of a fluid jet between the ports of a proportional fluidic amplifier. Since Bourdon pressure tubes are commercially available in a variety of materials, sizes and shapes, the invention may be adapted to accommodate a wide range of fluids and fluid pressure. By directing the flow of the working fluid through flexible tubing to a nozzle mounted on the moveable end of the Bourdon tube, deflection of the fluid stream impinging on the receiver may be closely controlled while the effects of sliding friction (and associated hysteresis effects) may be eliminated.

Accordingly, it is an object of this invention to provide an inexpensive fluid pressure transducer capable of receiving single-sided pressure signals from a sensed fluid and translating them into differential fluid signals suitable for direct application to standard fluidic devices while maintaining isolation between the sensed fluid and the working fluid of the fluidic system and to achieve these ends with a device comprising a minimum number of moving parts, which parts operate without sliding friction over a wide range of sensed fluid pressure.

Briefly stated, and in accord with one embodiment of the invention, a Bourdon pressure tube is provided which has a stationary open end in fluid communication with a sensed fluid, a deflectable closed end which moves in accord with pressure changes in the sensed fluid, and a nozzle which receives a working fluid through a flexible tubular member and directs the flow thereof onto a proportional-type fluidic receiver in response to the deflection of the moveable closed end of the Bourdon pressure tube.

The invention is pointed out with particularity in the appended claims. However, the other objects and advantages, together with the operation of the invention, may be better understood by reference to the following detailed description taken in connection with the following illustrations wherein:

FIG. 1 is a generalized representation of a first prior art transducer which utilizes a rigid pivoted jet pipe actuated by an expandable bellows.

FIG. 2 is a generalized representation of a second prior art transducer which utilizes a boundary layer type fluidic amplifier actuated by a flexible diaphragm located at the critical point on the wall of preferred attachment.

FIG. 3 represents a preferred embodiment of the invention, wherein a C-type Bourdon tube controllably imparts motion to a stream of fluid impinging on a proportional fluidic receiver.

FIG. 4 represents a sectional view taken on line 4—4 in FIG. 3.

FIG. 5 represents another embodiment of the invention wherein the Bourdon tube assumes a helical shape for greater mechanical gain.

FIG. 6 represents another embodiment of the invention wherein two Bourdon tubes are arranged in opposition to accommodate differential input signals.

FIG. 7 represents another embodiment of the invention wherein the Bourdon tube chamber is maintained at a pressure different from that of the atmosphere.

FIG. 8 represents another embodiment of the invention wherein the flexible tubular member is contained within the Bourdon tube.

FIG. 9 represents a sectional view taken on line 9—9 in FIG. 8.

FIG. 10 represents another embodiment of the invention wherein the sensed fluid issues from a small nozzle formed at the end of the Bourdon tube and is incorporated as the working fluid of an associated fluidic system.

In order to better illustrate the advantages of the invention and its contribution to the art, examples of the two prior art approaches, mentioned briefly above, will be described in some detail.

According to the prior art approach illustrated in FIG. 1, a rigid jet pipe 1, which is in fluid communication with a source of working fluid 2, is rotatable about pivotal mounting 3. The jet pipe is deflected by an expandable bellows 4 which is in fluid communication with a sensed fluid 5 and which expands in proportion to the difference between the pressure of the sensed fluid and the ambient (atmospheric) pressure 6. Biasing spring 7 serves to restore the jet pipe to its previous position when the pressure of the sensed fluid drops in relation to the pressure of the atmosphere. The jet of working fluid impinging upon receiver 8 is divided between output ports 9 and 10 in proportion to the relative pressure of the sensed fluid, resulting in an output for incorporation into an interpretive fluidic system.

According to the prior art approach illustrated in FIG. 2, a single-sided fluidic amplifier 21, designed to operate on boundary layer principles, is provided with a flexible diaphragm 22 at the junction of control port 23 and cavity 24. The source of working fluid 25 provides a constant fluid stream through cavity 24, along preferred wall 26 and the output port 27. As the pressure of the sensed fluid 28 rises in relation to the pressure in cavity 24, diaphragm 22 protrudes into the cavity, disturbing the boundary layer along preferred wall 26 and causing the fluid stream to "switch" to wall 29 and accordingly flow out of port 30.

As was indicated earlier, the prior art approach shown in FIG. 1 is limited by the sliding friction of the pivotal member, the inertia of the jet pipe, the multiplicity of moving parts, the relatively low pressure capability of the bellows, and the expense of production; while the prior art approach shown in FIG. 2 is limited by, among other things, a digital rather than analogue output.

Referring now to the preferred embodiment of the invention shown in FIG. 3, it is seen that there are three basic components: a Bourdon tube 31, a flexible tubular member 32, and a proportional fluidic receiver 33.

The Bourdon tube 31 is of the standard C-type. It is surrounded by ambient fluid 34, which is assumed to be air at atmospheric pressure, and has a curved portion and a non-circular cross-section. The flexible tubular member 32 is secured along the curved portion of Bourdon tube 31 so as to move therewith, as is best illustrated in FIG. 4. The stationary open end 35 of the Bourdon tube is in fluid communication with a sensed fluid 36. The moveable closed end 37 of the Bourdon tube is located in proximity to the two ports 38 and 39 of proportional fluidic receiver 33. A nozzle 40 is connected at the closed end 37 of the Bourdon tube and is in fluid communication with a source of working fluid 41 through the flexible member 32 which is bonded or coextruded along the outside of the curved portion of the Bourdon tube in such a manner as to make it an integral part of the device while providing a minimum of mechanical resistance to the movement of the Bourdon tube. Nozzle 40 may comprise a separate mechanical element or it may be formed at the output end of tubular member 32. Proportional fluidic receiver 33 is disposed with respect to the output of nozzle 40 so that the stream of working fluid passing from nozzle 40 will be intercepted by output ports 38 and 39 in proportion to the degree of deflection imparted to the nozzle 40 by the movement of the closed end of the Bourdon tube. Normally, when the Bourdon tube is in its relaxed state, nozzle 40 will be located so as to direct the flow of the working fluid exclusively to output port 39. When the pressure of the sensed fluid 36 increases with respect to the ambient pressure 34, the radius of curvature of Bourdon tube 31 will increase proportionally, causing nozzle 41 to move in relation to the receiver as indicated by dashed outline 42. When the pressure of the sensed fluid 36 decreases with respect to the ambient pressure 34, the resilience of the Bourdon tube will move nozzle 40 toward its original position. It is realized of course, that a single-sided fluidic output may be obtained simply by venting one of the two output ports, 38 or 39, while connecting the other output port to an appropriate utilization device.

A second embodiment of the invention shown in FIG. 5 is suitable for application where the pressure magnitudes associated with the sensed fluid are relatively low. In this embodiment of multiturn Bourdon tube 50, shaped in the form of a helix, is employed to provide increased mechanical gain, i.e., a greater amount of deflection at the closed end of the Bourdon tube per unit of pressure change in the sensed fluid. The Bourdon tube might equally well assume the shape of a spiral or any other geometry which allows for increased length in the curved portion of the Bourdon tube. The helically-disposed Bourdon tube 50 in FIG. 5 has a stationary open end 51 which is in fluid communication with sensed fluid 52. An axially-oriented nozzle 54 is connected to the moveable closed end 53 of the Burdon tube. Nozzle 54 is in fluid communication with a source of working fluid 55 through flexible tubular member 56. Proportional fluidic receiver 57, having ports 58 and 59, is disposed relative to nozzle 54 so that the stream of working fluid passing from the nozzle will be intercepted by the respective ports in proportion to the degree that a pressure change in sensed fluid 52 results in displacement of the closed end 53 of the Bourdon tube (indicated by dashed outline).

A third embodiment of the invention shown in FIG. 6 is adapted to receive differential input signals. Two C-type Bourdon tubes 60 and 61 are, respectively, in fluid communication with a first sensed fluid 62 and a second sensed fluid 63. The two Bourdon tubes have their moveable closed ends mechanically connected by linkage 64 to nozzle 65. Nozzle 65, which is supplied by a source of working fluid 66 through a flexible tubular member 67 directs a jet of working fluid into the ports of fluidic receiver 68. Since the sealed ends of Bourdon tubes 60 and 61 individually move in response to the difference between the pressure of their respective sensed fluids 62 and 63 and the ambient pressure 69, the resultant deflection of nozzle 65 is indicative of the difference in pressure between the two sensed fluids. In this case the pressure of the two sensed fluids may both vary or the pressure of one sensed fluid may be held constant while the pressure of the other is allowed to vary. Bourdon tubes 60, 61 may each also be of the multiturn type, and of helical form, as in the case of tube 50 in the FIG. 5 embodiment.

In a fourth embodiment of the invention shown in FIG. 7, a C-type Bourdon tube 70 and a flexible tubular member 71 are contained within a sealed cavity 72. The cavity 72 is in fluid communication with a source of reference fluid 73. Accordingly, pressure within the cavity 72 is maintained at the pressure of the reference fluid. In this case the closed end of the Bourdon tube, and attached nozzle 74, move in proportion to the difference between the pressure of the sensed fluid 75 and the reference fluid 73. The jet of working fluid issuing from nozzle 74 is resultantly divided between the two ports 76 and 77 of proportional fluidic receiver 78. In no case may the pressure of reference fluid 73 exceed the pressure of working fluid 79, since this would inhibit the flow of working fluid 79 from nozzle 74.

In a fifth embodiment of the invention shown in FIG. 8 a C-type Bourdon tube 80 and a proportional fluidic receiver 81 are in an arrangement similar to that shown in FIG. 3 except that nozzle 82 extends through the closed end of the Bourdon tube and is in fluidic communication with working fluid source 83 via a flexible tubular member 84 which runs along the interior of the Bourdon tube, as indicated in FIG. 9. In this arrangement, flexible tubular member 84 may be bonded to the inside of the Bourdon tube, or coextruded with the Bourdon tube, or simply looped between the nozzle 82 and the point 85 where the flexible tubular member passes into working fluid source 83. Operation of this embodiment of the invention is essentially the same as the operation of the embodiment described above in conjunction with FIG. 3.

Finally, in applications where the pressure of the fluid being sensed is far above the pressure level at which standard fluidic elements will properly operate, but where the physical properties of the sensed fluid make it suitable for incorporation as the working fluid in a fluidic system; the embodiment of the invention which is shown in FIG. 10 may be used. In this embodiment the moveable "closed end" of a C-type Bourdon tube 90 is modified by the formation of a nozzle 91 whose inside dimension is considerably smaller than the inside dimension of the Bourdon tube so as to allow a stream of fluid to issue therefrom while not substantially impairing the operation of the Bourdon tube. Should the inside dimension of the nozzle be too large, back pressure in the Bourdon tube will be insufficient and it will not deflect in response to pressure increases in sensed/working fluid 92. When the nozzle 91 is of appropriate dimension, a stream of fluid issuing therefrom will be initially directed into port 94 of fluidic receiver 95. As the pressure of sensed/working fluid 92 increases with respect to ambient pressure 96 the Bourdon tube will deflect and a proportional amount of the fluid stream will be directed into port 96 of the fluidic receiver.

It will be apparent to those skilled in the art that the Bourdon tube fluidic transducer of the invention may take various forms and embodiments other than the preferred forms specifically set out and described above. For instance, in the relaxed state of the Bourdon tube, the nozzle may be positioned to direct the working fluid midway between the receiver ports instead of to port 39 as described with reference to the FIG. 3 embodiment. Finally, the working fluid member nozzle axis may be angularly disposed relative to the Bourdon tube moveable closed end axis in a vertical direction as viewed in FIGS. 3–8 within a range of ±90° from coincidence, although such angle is more typically in the range of 0 to +60° wherein the positive angle is in the direction of increasing radius of curvature of the Bourdon tube. The axial relationship hereinabove described is one factor determining the sensitivity of my fluidic transducer invention; other factors are the stiffness of the Bourdon tube, size of ports in the fluidic receiver, nozzle-to-receiver spacing, and pressure of the working fluid. As a typical example of my invention, assume the sensed fluid is steam at a pressure of 1000 p.s.i.g. which high pressure is not compatible with state of the art fluid amplifier devices. A FIG. 3 embodiment of my invention comprising a stainless steel Bourdon tube having a radius of curvature of approximately ¾ inch provides an interface for changing the high pressure steam signal to a low pressure signal in a fluid compatible with fluid amplifiers such as air or liquid. The working fluid pressure may typically be in a range of 1 to 10 p.s.i.g., and the differential pressure signal $\Delta P_0$ developed across the two receiver ports is $$\Delta P_0 = G P_{in}$$

where G is the transducer sensitivity and $P_{in}$ is the steam pressure. Thus, it is intended by the appended claims to cover all such modifications of the invention which fall within the true spirit and scope of the following claims.

What we claim as new and desire to secure by Letters Patent of the United States is:

1. A fluid-operated control device comprising
   a Bourdon pressure tube surrounded by an ambient fluid and having a stationary open end and a movable closed end, said stationary open end being connected to and in fluid communication with a sensed fluid which may be corrosive, contain impurities or be at relatively high pressure and therefore unsuitable for use in fluidic circuitry,
   a tubular member external of said Bourdon pressure tube to provide a minimum of mechanical resistance to the movement thereof and having an input end for receiving a working fluid suitable for use in fluidic circuitry, a flexible portion, and an output open end separated from said input end by said flexible portion, said output end forming said working fluid into a fluid jet as said working fluid passes from said tubular member,
   connecting means for rigidly and directly connecting the output end of said tubular member to the closed end of said Bourdon tube whereby the output end of said tubular member moves only in response to motion of the movable closed end of said Bourdon pressure tube which moves in response to pressure changes in the sensed fluid, and
   fluid-receiving means in direct fluid communication with the output end of said tubular member for intercepting said working fluid jet passing from the output end of said tubular member in response to the position of said output end, the pressure of the working fluid recovered in said fluid-receiving means being determined by the pressure of the sensed fluid but isolated therefrom.

2. A fluid-operated control device as recited in claim 1 wherein said fluid-receiving means comprises a proportional fluidic receiver including a pair of output ports.

3. A fluid-operated device as recited in claim 1 wherein said fluid-receiving means comprises a single-sided fluidic receiver.

4. A fluid-operated control device as recited in claim 1 wherein said Bourdon pressure tube is of the C-type.

5. A fluid-operated control device as recited in claim 1 wherein said ambient fluid is maintained at atmospheric pressure.

References Cited
UNITED STATES PATENTS

| | | | |
|---|---|---|---|
| 2,356,970 | 8/1944 | Brockett | 137—85X |
| 2,667,886 | 2/1954 | Brewster | 137—84 |
| 3,386,343 | 6/1968 | Gray | 91—3X |

FOREIGN PATENTS

| | | | |
|---|---|---|---|
| 150,088 | 10/1931 | Switzerland | 91—3 |

ALAN COHAN, Primary Examiner

U.S. Cl. X.R.

91—3

PO-1050
(5/69)

UNITED STATES PATENT OFFICE
CERTIFICATE OF CORRECTION

Patent No. 3,606,902                    Dated September 21, 1971

Inventor(s) JEFFREY N. SHINN and CARL W. WOODSON

It is certified that error appears in the above-identified patent and that said Letters Patent are hereby corrected as shown below:

Column 6, line 50,    after "c-type", --, the output end of said tubular member oriented substantially perpendicular to the closed end of said Bourdon pressure tube -- should be inserted.

Signed and sealed this 4th day of April 1972.

(SEAL)
Attest:

EDWARD M. FLETCHER, JR.                ROBERT GOTTSCHALK
Attesting Officer                      Commissioner of Patents